United States Patent Office 3,476,721
Patented Nov. 4, 1969

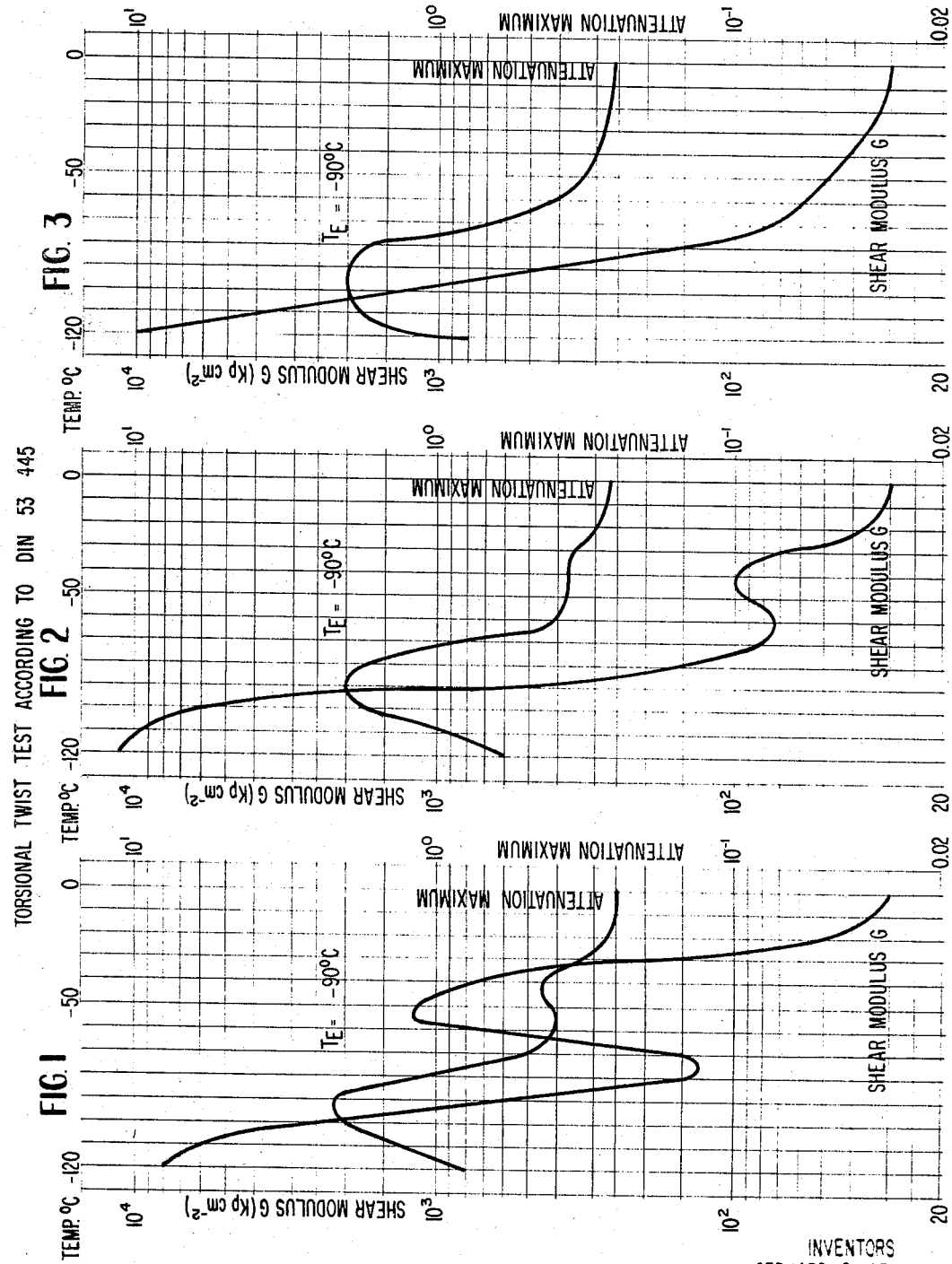

3,476,721
POLYBUTADIENE MODIFIED TO REDUCE LOW TEMPERATURE CRYSTALLIZATION
Gerhard Binder, Marl, and Karl-Heinz Nordsiek, Hamm-Bossendorf, Germany, assignors to Chemische Werke Huels A.G., Marl, Germany
Filed Aug. 10, 1967, Ser. No. 659,682
Claims priority, application Germany, Aug. 19, 1966, C 39,908
Int. Cl. C08d 3/04
U.S. Cl. 260—82.1                          10 Claims

ABSTRACT OF THE DISCLOSURE

Low temperature properties of highly linear low pressure 1,4-cis polybutadiene are improved by admixing a minor proportion of certain mono- and diolefins with the butadiene monomer polymerized.

---

Applicants hereby claim the benefit of the filing data of West German patent application C39,908 IVd/39b of Aug. 19, 1966, pursuant to the provisions of 35 U.S.C. 119.

The present invention relates to modified, essentially linear 1,4-cis polybutadiene, its vulcanizates and its method of preparation. The modification is effected by polymerizing, in admixture with the butadiene monomer, a minor proportion of another olefin. More specifically, the other olefin is a monoolefin of from 2 to 6 carbon atoms, e.g. ethylene and 1-hexene, and/or a diolefin of from 5 to 12 carbon atoms, e.g. isoprene and 2,4-hexadiene.

The vulcanizates are prepared from the polymer in the same manner as vulcanizates are ordinarily prepared from polybutadiene having a high 1,4-cis proportion.

Said polymer is prepared with stereospecific catalysts in the same manner as polybutadiene having a high 1,4-cis proportion, except that the indicated other olefin is in admixture with monomeric butadiene being polymerized. Stereospecific catalysts are known for the indicated purpose and are not, per se, the essence of the subject invention.

The attached drawings are graphical representations of the low temperature properties of vulcanizates from polymers prepared according to the invention (FIGURES 2 and 3) as compared with those of vulcanizate from the most closely comparable polybutadiene (FIGURE 1).

With increasingly higher demands on properties of rubber articles at very low temperatures, e.g. rubber parts in airplane construction, a need has developed for vulcanizates which retain, under extreme cold, good impact resistance, flexibility and minimum brittleness, so that they will be satisfactory for use as structural components.

Natural rubber vulcanizates at $-40°$ C. are too hard and inelastic to be useful. Moreover, they have the brittleness and fragility of glass. Even synthetic butadiene/styrene copolymers do not lower the useful range to below $-60°$ C. Optimum prospects are offered at present only by certain types of silicone rubber. In such polymer chains, which are specifically substituted, solidification temperatures of about $-100°$ C. are realized. However, below $-70°$ C. a pronounced tendency to crystallize occurs rapidly, resulting, under high stress, in disadvantages, such as hardening, increased danger of rupture and disappearance of elasticity. Moreover, silicone rubber vulcanizates require much more expensive raw materials and more costly processing than the other products discussed herein. Thus, because of the preceding reasons, among others, silicone rubbers have a limited field of application as compared to other rubbers.

A more desirable spectrum of total properties is presented, with respect to the production of low temperature resistant special rubber articles, by highly linear 1,4-cis polybutadienes. Such polybutadienes, having otherwise good properties, are additionally distinguished by an extraordinarily favorable abrasion as well as an unexcelled degree of elasticity. The lowest useful temperatures of the vulcanizates which can be obtained therefrom range, depending upon the manufacturing method employed, between $-70°$ C. and $-90°$ C. A variation of low temperature properties depends on the cis content as well as on the 1,2-proportion of the polybutadiene chain, which properties are in turn attributable to the catalyst employed, for example:

| Catalyst | Cis Units, percent | 1,2- Units, percent | Glass Transition Temperature, °C. |
|---|---|---|---|
| Organolithium Compound | ~45 | 10 | −70 |
| Organotitanium Compound | ~94 | 4 | −85 |
| Organocobalt Compound | ~98 | 1 | −90 |

The products having the highest cis content and the lowest glass transition temperature, however, behave with respect to their tendency to crystallize at low temperatures in a manner similar to that of the above-mentioned silicone rubbers, which is disadvantageous under extreme conditions.

It is an object of this invention to produce a polymer, the vulcanizate of which has useful rubber-like properties under conditions of extreme cold. A further object is that the vulcanizate possess essentially universal applicability.

An additional object is that the polymer be prepared according to established procedures in existing equipment and that vulcanizates be produced from said polymer using known compounding formulations and standard procedures, and said polymer should be produced from readily available relatively inexpensive raw materials.

Upon further study of the specification and claims, other objects and advantages of the present invention will become apparent.

Polybutadienes with a high cis, particularly 1,4-cis, content have a favorable overall spectrum of low temperature properties. To reduce the tendency of such polybutadienes to crystallize even under conditions of extreme cold, specific compositions can be advantageously employed.

Such compositions ordinarily require substances having an isomerizing effect, resulting in a disturbance of molecular linearity. Increasing the sulfur content during vulcanization is further effective in this regard. Pretreatment of the monomer with specific substances, e.g. butadienesulfone, which strongly catalyze isomerization, can also be employed for the same purpose.

However, all of these measures only lead to partial success. In each case, special expenses are incurred, and the processes are not economical.

Polymerizing butadiene with a stereospecific catalyst to produce polybutadiene with a high 1,4-cis proportion is known. Conventional vulcanization of the resulting polybutadiene has also been established. By admixing with the butadiene monomer, prior to polymerization initiation, from 0.1 to 10%, preferably from 0.5 to 5%, by weight (based on the weight of butadiene) of another olefin, the polymer produced in accord with otherwise established procedure, when vulcanized in the conventional manner, exhibits the desired low temperature properties.

The other olefin is either a monoolefin, a diolefin or a mixture thereof. Suitable monoolefins are those having from 2 to 6 carbon atoms, such as, for example, ethylene, propylene, the isomers of butene, e.g. α-butene, the isomers of pentene, e.g. 3-methylbutene-1 and the isomers of hexene, e.g. 2-hexene+styrene. The contemplated diolefins have from 5 to 12 carbon atoms and are either aliphatic dienes, such as isoprene, piperylene, isomers of hexadiene, e.g. 2,4-hexadiene, and isomers of nonadiene, e.g. 3-n-propylhexadiene-1,3 or alicyclic dienes, such as cyclohexadiene.

The mixture may be one of monoolefins, one of diolefins or a combination of mono- and diolefins. The total weight proportion of the mixture, however, should be maintained within the noted limits.

Isoprene is the preferred other olefin.

Stereospecific catalyst systems for preparing polybutadiene having a high 1,4-cis proportion are known. These catalyst systems, known as Ziegler catalysts, are employed for producing the novel polymer. Such systems include, e.g., an organoaluminum compound, such as aluminum triethyl, and particularly a cobalt salt, such as cobaltous chloride.

The resulting novel polymerizates contain a statistical distribution of structural units attributable to "the other olefin" in amounts of from 0.1 to 8%, preferably 0.3 to 4%, by weight based on the weight of the total polymer. In other words the resulting product is a true copolymer with statistically distributed 2-olefins.

Said polymerizates have a molecular weight range of from 20,000 to 500,000, preferably from 150,000 to 400,000, and a 1,4-cis content in excess of about 90%.

Vulcanizates of said polymerizates exhibit no deleterious crystallization tendency even at temperatures in the range of $-70°$ to $-100°$ C. The total spectrum of properties of these vulcanizates corresponds to that of the normal polybutadienes having a high 1,4-cis proportion, but the vulcanizates, in contradistinction to normal polybutadienes, show a considerably increased and lasting low temperature resistance.

Conventional polybutadiene fillers are useful for these vulcanizates without discernible disadvantage. For carrying out the vulcanization all usual vulcanizing agents such as peroxides and specific resins as well as all usual vulcanizing accelerators may be used.

The vulcanizates produced in the described manner are useful in the manufacture of rubber articles which must retain their rubber properties under extremely low temperature conditions. Examples of such articles are gaskets used as window seals and the like in airplanes.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

COMPARATIVE EXAMPLE 1

Butadiene is polymerized at 50° C. with a catalyst system of cobalt and an organoaluminum compound specifically cobalt chloride, diethyl aluminum chloride.

The resultant polybutadiene having an ML-4 of 48 and cis content of 98% is vulcanized in accordance with the following recipe:

| | Parts |
|---|---|
| Polybutadiene rubber | 100 |
| ZnO | 5 |
| Stearic acid | 2 |
| Aromatic softening oil | 8 |
| HAF (high abrasion furnace) carbon black | 50 |
| Sulfur | 2 |
| Vulkacid CZ (N-cyclohexyl-benzothiazol-sulfenamide) | 0.75 |

Heating temperature: 143° C.
Heating period: 40 minutes.

In this process, the following data are obtained for the vulcanizate:

| | |
|---|---|
| Tensile strength, kg./cm.² | 158 |
| Elongation, percent | 415 |
| Modulus at 300% elongation | 104 |
| Tear strength according to Pohle, kg./cm. | 12 |
| Rebound elasticity: | |
| 22° C. | 54 |
| 75° C. | 56 |
| Hardness ° Shore | 60 |
| Abrasion according to DIN | 32 |

The behavior at low temperatures of this polybutadiene having the highest cis-content (98%) is represented in FIGURE 1 by the torsional twisting test according to DIN-53-445.

EXAMPLE 1

Butadiene is polymerized as described in Comparative Example 1, with the addition to the butadiene monomer of 2 parts of isoprene per 100 parts by weight of butadiene, the resultant polymer having a ML-4 of 46. The polymerizate contains 1% of isoprene units in a statistical arrangement. The vulcanized product manufactured analogously to Comparative Example 1 yields the following spectrum of properties:

| | |
|---|---|
| Tensile strength, kg./cm.² | 150 |
| Elongation, percent | 398 |
| Modulus at 300% elongation | 106 |
| Tear strength according to Pohle, kg./cm. | 12 |
| Rebound elasticity: | |
| 22° C. | 54 |
| 75° C. | 56 |
| Hardness ° Shore | 60 |
| Abrasion according to DIN | 29 |

The above-cited test of low temperature behavior (FIGURE 2) yields, in the shear modulus attenuation diagram, only a weak secondary maximum, pointing to very weak tendency to crystallize and corresponding approximately to that of lithium polybutadiene. However, the glass transition temperature is unchanged at $-90°$ C.

EXAMPLE 2

Cobalt polybutadiene, having an ML-4 value of 45, is produced as in Comparative Example 1, but with 4 parts of isoprene per 100 parts of butadiene. The polymer has 2% statistically incorporated isoprene components. The vulcanizate manufactured as in Comparative Example 1, yields the following results:

| | |
|---|---|
| Tensile strength, kg./cm.² | 151 |
| Elongation, percent | 410 |
| Modulus at 300% elongation | 103 |
| Tear strength according to Pohle, kg./cm. | 12 |
| Rebound elasticity: | |
| 22° C. | 54 |
| 75° C. | 56 |
| Hardness ° Shore | 60 |
| Abrasion according to DIN | 30 |

The shear modulus curve (FIGURE 3) shows that this product is completely devoid of any low temperature crystallization. This behavior is otherwise only observed in the lithium polymerization. Lithium polymerizates, as is known, attain a cis-proportion of at most only 40%, wherefrom there are obtained deviations in the vulcanizate, including a glass transition temperature ($-80°$ to $-85°$) which is less favorable by 10–15° C. Such copolymers are identical with said homopolymer regarding their molecular weight, cis-1,4-contents and distribution of molecular weight.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In low pressure catalytic polymerization of butadiene with comonomer and with stereo-specific catalyst consisting essentially of an organo-aluminum compound and a cobalt salt to produce a polymer having a high 1,4-cis proportion, the improvement wherein the comonomer is 0.1–10% by weight, based on the weight of said butadiene, is selected from the group consisting of a monoolefin of 2–6 carbon atoms and a diolefin of 5 carbon atoms, and mixtures thereof.

2. A polymerization according to claim 1 wherein the amount of the comonomer is from 0.5–5% by weight and said comonomer is a diolefin.

3. A polymerization according to claim 1 wherein the comonomer is isoprene.

4. In an essentially linear polybutadiene polymerizate having a 1,4-cis proportion of at least about 98%, the improvement comprising the presence therein of statistically distributed copolymeric units from at least one other olefin, said other olefin being a member selected from the group consisting of a monoolefin of 2–6 carbon atoms and a diolefin of 5 carbon atoms, said units of said other olefin being present in an amount of from 0.1–8% by weight based on the weight of the polymerizate.

5. A polymerizate according to claim 1 wherein the amount is from 0.3–4% by weight.

6. A polymerizate according to claim 5 wherein said other olefin is a hydrocarbon monoolefin.

7. A polymerizate according to claim 5 wherein said other olefin is a hydrocarbon aliphatic diolefin.

8. A polymerizate according to claim 7 wherein said other olefin is isoprene.

9. A polymerizate according to claim 5 wherein said other olefin is a hydrocarbon alicyclic diolefin.

10. A vulcanizate of a polymerizate defined by claim 4, said vulcanizate having an essentially negligible tendency to crystallize at temperatures about −50° C.

References Cited

UNITED STATES PATENTS

| | | | |
|---|---|---|---|
| 3,355,419 | 11/1967 | Cook | 260—45.9 |
| 3,357,960 | 12/1967 | Barton et al. | 260—85.3 |
| 3,363,659 | 1/1968 | Keckler et al. | 152—330 |

JOSEPH L. SCHOFER, Primary Examiner

R. A. GAITHER, Assistant Examiner

U.S. Cl. X.R.

260—85.3

UNITED STATES PATENT OFFICE
CERTIFICATE OF CORRECTION

Patent No. 3,476,721            Dated November 4, 1969

Inventor(s) Gerhard Binder and Karl-Heinz Nordsiek

It is certified that error appears in the above-identified patent and that said Letters Patent are hereby corrected as shown below:

Column 6, Line 1, Change "1" to ---4---

SIGNED AND SEALED
OCT 20 1970

(SEAL)
Attest:

Edward M. Fletcher, Jr.
Attesting Officer

WILLIAM E. SCHUYLER, JR.
Commissioner of Patents